United States Patent
Krasznai et al.

(10) Patent No.: US 8,448,788 B2
(45) Date of Patent: May 28, 2013

(54) NESTED BOWL RETENTION MECHANISM FOR FOOD PROCESSORS

(75) Inventors: Charles Z Krasznai, Bridgeport, CT (US); Barbara L Schnabel, Chappaqua, NY (US); James A. Sandor, Trumbull, CT (US); Chi Tong Chan, Chaiwan (HK)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 12/884,751

(22) Filed: Sep. 17, 2010

(65) Prior Publication Data

US 2011/0174654 A1 Jul. 21, 2011

Related U.S. Application Data

(60) Provisional application No. 61/244,293, filed on Sep. 21, 2009.

(51) Int. Cl.
*B65D 85/62* (2006.01)

(52) U.S. Cl.
USPC .......................... 206/499; 206/505; 220/23.89

(58) Field of Classification Search
USPC ....... 206/499, 505, 507–509, 512; 220/23.83, 220/23.87–23.89; 241/100, 101.01, 301
See application file for complete search history.

(56) References Cited

U.S. PATENT DOCUMENTS

| 3,759,416 | A | * | 9/1973 | Constantine | 206/505 |
| 4,782,945 | A | * | 11/1988 | Geiler et al. | 206/203 |
| 4,834,253 | A | * | 5/1989 | Crine | 220/23.83 |
| 5,454,478 | A | * | 10/1995 | Everson | 220/23.83 |
| 5,634,569 | A | * | 6/1997 | DeCoster | 220/23.83 |
| 6,708,824 | B2 | * | 3/2004 | Sahm, III | 206/505 |
| 2005/0077195 | A1 | * | 4/2005 | Nall | 206/216 |
| 2006/0180491 | A1 | * | 8/2006 | Zephir et al. | 206/507 |
| 2007/0272580 | A1 | * | 11/2007 | Bellon | 206/515 |

* cited by examiner

*Primary Examiner* — Luan K Bui

(74) *Attorney, Agent, or Firm* — McCormick, Paulding & Huber LLP

(57) ABSTRACT

A bowl assembly 1 includes a first bowl 2, a second bowl 3, and a third bowl 4. The first bowl 2 has the largest inner diameter of the three. The second bowl 3 has an outer diameter which is less than the inner diameter of the first bowl 2. The third bowl 4 has an outer diameter which is less than the inner diameter of the second bowl 3. Each bowl has at least one frictional detent mechanism to engage the adjacently placed bowl.

3 Claims, 2 Drawing Sheets

NESTED BOWL RETENTION MECHANISM FOR FOOD PROCESSORS

RELATED APPLICATIONS

This application is related to and claims priority from U.S. Provisional Application 61/244,293.

BACKGROUND OF THE INVENTION

The present invention relates to electric appliances and, more particularly, to electric food processor appliances.

DESCRIPTION OF RELATED ART

Various design exist for electric food processors in which a bowl is positioned on a base containing an electric motor and driven blade that chops or mixes food product inside of the bowl. A lid is positioned over the bowl during operations. Certain designs exist in which a plurality of bowls are nested, or stacked within one another, during operations. Generally, the purpose of this is because the lid is normally committed to the largest diameter bowl and, therefore, to avoid the need for additional lids, certain designs allow for nesting of bowls.

One shortcoming of nested bowls in food processors is that the bowls are not secured to each other and, therefore, a user cannot lift the exterior bowl by its handle and pour the contents of an internally nested bowl without the internal bowl or bowls falling out.

OBJECT OF THE PRESENT INVENTION

It is an object of the present invention to provide a system of nesting bowls for use in a food processor in which the bowls nest and attach to each other securely.

These and other objects are achieved by the present invention disclosed herein.

SUMMARY OF THE INVENTION

According to the present invention, a plurality of food processor bowls are adapted to be nested. The largest bowl has frictional detent mechanisms on its inner wall. The second largest bowl has frictional detent mechanisms on its inner wall and on its outer wall. The third bowl, smallest of the three, has frictional detent mechanisms on its outer wall.

DESCRIPTION OF THE PREFERRED EMBODIMENT OF THE PRESENT INVENTION

Figure 1:
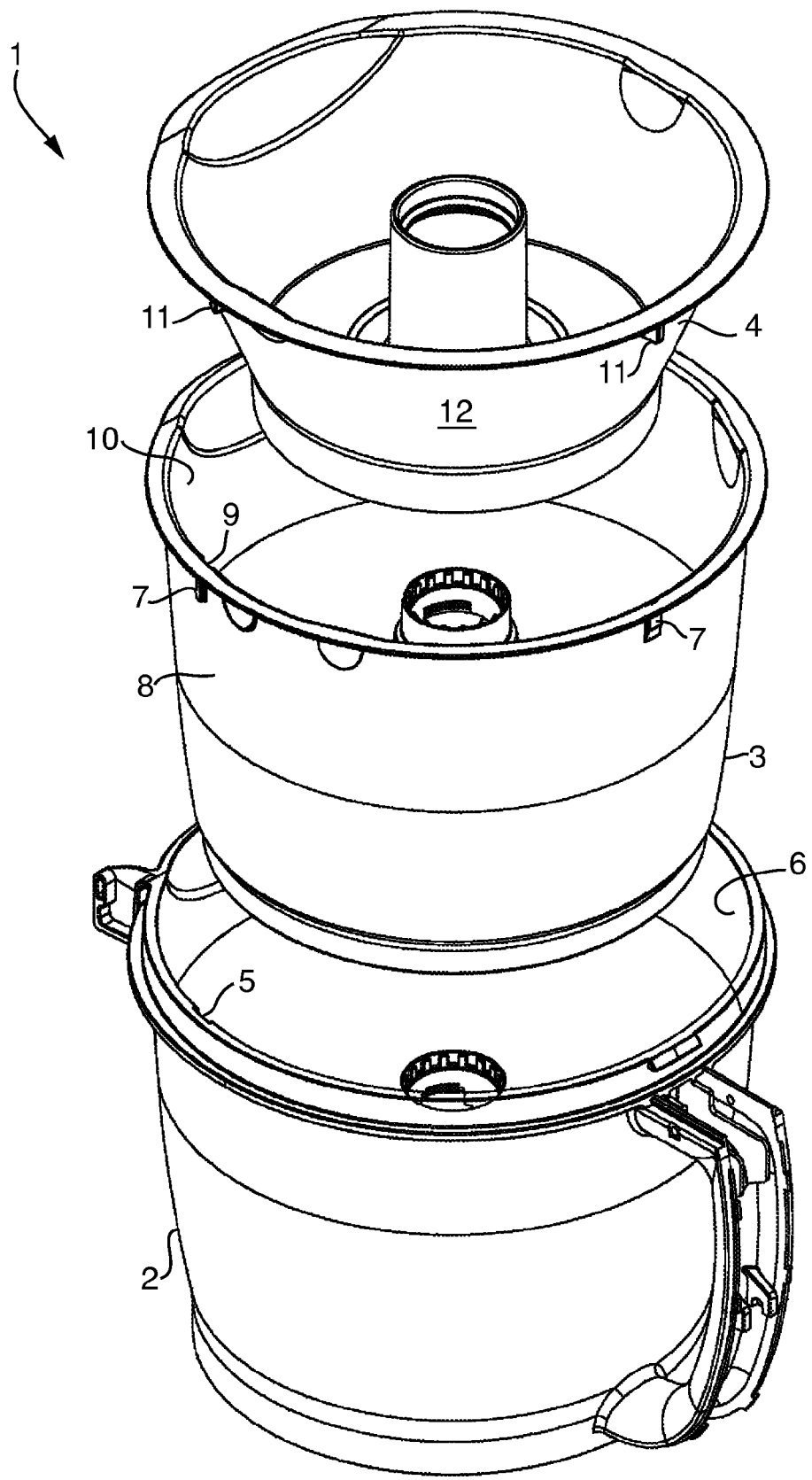
FIG. 1 is an exploded, perspective view of a preferred embodiment of the present invention.
Figure 2:
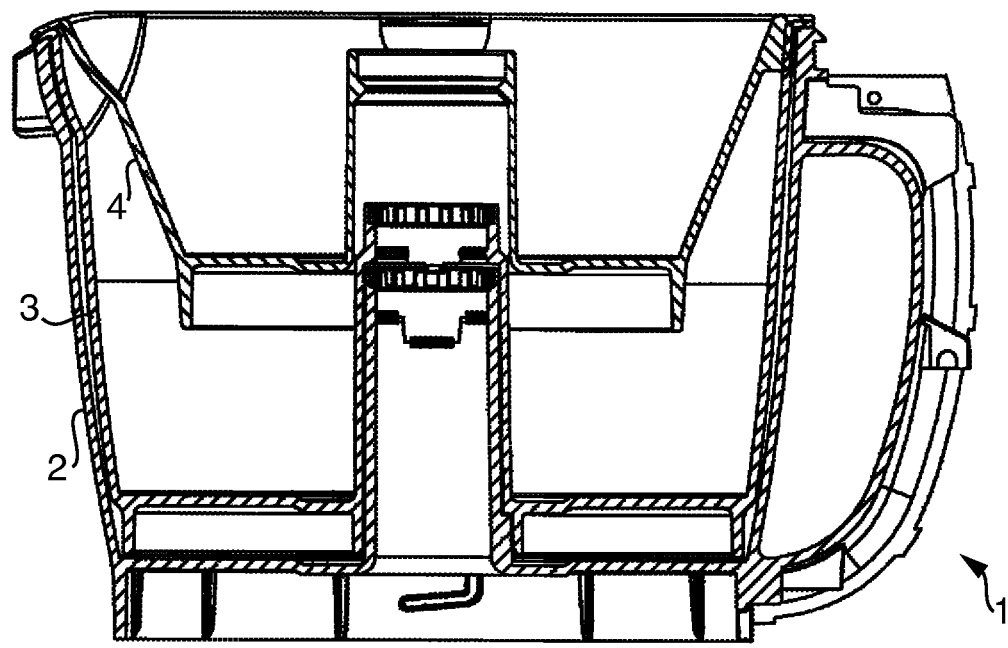
FIG. 2 is a side, cross-sectional view of a preferred embodiment of the present invention.

Referring to FIGS. 1-2, a bowl assembly 1 comprises a first bowl 2, a second bowl 3, and a third bowl 4.

The first bowl 2 has the largest inner diameter of the three. It has at least one frictional detent mechanism 5 on its inner wall 6. It may have a plurality of such detent mechanisms 5 located about its inner circumference.

The second bowl 3 has an outer diameter which is less than the inner diameter of the first bowl 2. It has at least one frictional detent mechanism 7 on its outer wall 8. It may have plurality of such detent mechanisms 7 located about its outer circumference. It has at least one frictional detent mechanism 9 on its inner wall 10. It may have a plurality of such detent mechanisms 9 located about its inner circumference.

The third bowl 4 has an outer diameter which is less than the inner diameter of the second bowl 3. It has at least one frictional detent mechanism 11 on its outer wall 12. It may have a plurality of such detent mechanisms 11 located about its outer circumference.

Each detent mechanism is either male or female in shape to cooperate with a corresponding mechanism on an adjacent bowl. For example, mechanisms 5 and 7 fit together. And mechanisms 9 and 11 fit together.

The height and location of the inner and outer detent mechanisms 7, 11 are such that the rim of the second bowl 3 is in contact with the rim of the first bowl 2 when the second bowl 3 s nested within the first bowl 2, and such that the rim of the third bowl 4 is in contact with the rim of the second bowl 3 when the third bowl 4 is nested within the second bowl 3.

While the preferred embodiment of the present invention has been disclosed herein, it is understood that various modification can be made without departing from the scope of the presently claimed invention.

What is claimed is:

1. A system of nesting various sized food processor bowls, said system comprising
    a generally cylindrically-shaped first bowl having a first bowl inner diameter;
    a first bowl inner detent mechanism adjacent to a rim of said first bowl on an inner wall of said first bowl, said inner detent mechanism being female in shape and having a height that is less than ½ of a height of said first bowl;
    a generally cylindrically-shaped second bowl having a second bowl outer diameter that is less than the first bowl inner diameter; and
    a second bowl outer detent mechanism adjacent to a rim of said second bowl on an outer wall of said second bowl, said outer detent mechanism being male in shape and having a height that is less than ½ of a height of said second bowl, said second bowl outer detent mechanism being adapted to frictionally engage said female first bowl inner detent mechanism to retain said second bowl in said first bowl;
    wherein said height and location of said inner and outer detent mechanisms permit said second bowl to be nested substantially within said first bowl without said outer detent mechanism of said second bowl being engaged with said inner detent mechanism of said first bowl; and
    wherein said height and location of said inner and outer detent mechanisms are such that said second bowl is not held in spaced relation to said first bowl such that said rim of said second bowl is in contact with said rim of said first bowl in stacked relationship such that said second bowl is supported by said rim of said first bowl when said second bowl is nested within said first bowl.

2. A system according to claim 1, further comprising
    a third bowl having third bowl outer diameter;
    said second bowl having a second bowl inner diameter that is greater than said third bowl outer diameter;
    a second bowl inner detent mechanism on an inner wall of said second bowl, said second bowl inner detent mechanism being female in shape; and
    a third bowl outer detent mechanism on an outer wall of said third bowl, said third bowl outer detent mechanism being male in shape and being adapted to frictionally engage said female second bowl inner detent mechanism to retain said third bowl in said second bowl;

wherein said third bowl is generally frusto-conical in shape.

3. A system of nesting various sized food processor bowls, said system comprising
- a first bowl having a first bowl inner diameter;
- a plurality of first bowl female inner detent mechanisms on an inner wall of said first bowl adjacent to a rim of said first bowl;
- a second bowl having a second bowl outer diameter that is less than the first bowl inner diameter, and a second bowl inner diameter;
- a plurality of second bowl male outer detent mechanisms on an outer wall of said second bowl adjacent to a rim of said second bowl and being adapted to frictionally engage said first bowl female inner detent mechanisms to retain said second bowl in said first bowl;
- a third bowl having a third bowl outer diameter that is less than said second bowl inner diameter;
- a plurality of second bowl female inner detent mechanisms on an inner wall of said second bowl adjacent to said rim of said second bowl; and
- a plurality of third bowl male outer detent mechanisms on an outer wall of said third bowl and being adapted to frictionally engage said second bowl female inner detent mechanisms to retain said third bowl in said second bowl;

wherein said plurality of first bowl female inner detent mechanisms and said plurality of second bowl male outer detent mechanisms are diminutive in height as compared to a height of said first and second bowls such that said second bowl is adapted to be nested within said first bowl without said plurality of said second bowl male outer detent mechanisms being engaged in said plurality of first bowl female inner detent mechanisms;

wherein said rim of said second bowl is in contact with said rim of said first bowl in stacked relationship such that said second bowl is supported by said rim of said first bowl when said second bowl is nested within said first bowl when said plurality of said second bowl male outer detent mechanisms are engaged in said plurality of first bowl female inner detent mechanisms;

wherein said rim of said third bowl is in contact with said rim of said second bowl in stacked relationship such that said third bowl is supported by said rim of said second bowl when said third bowl is nested within said second bowl when said plurality of said third bowl male outer detent mechanisms are engaged in said plurality of second bowl female inner detent mechanisms;

wherein said first bowl and said second bowl are generally cylindrical in shape and said third bowl is generally frusto-conical in shape.

* * * * *